Oct. 24, 1967 R. E. POWERS 3,348,669
BODY UNIT COMPRISING A STICK OF SEVERABLE FASTENERS
Filed Jan. 18, 1965
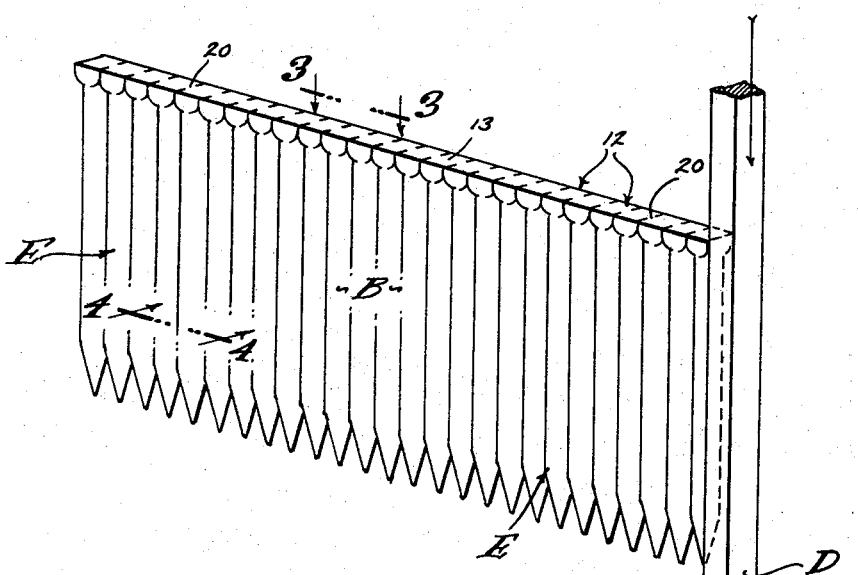
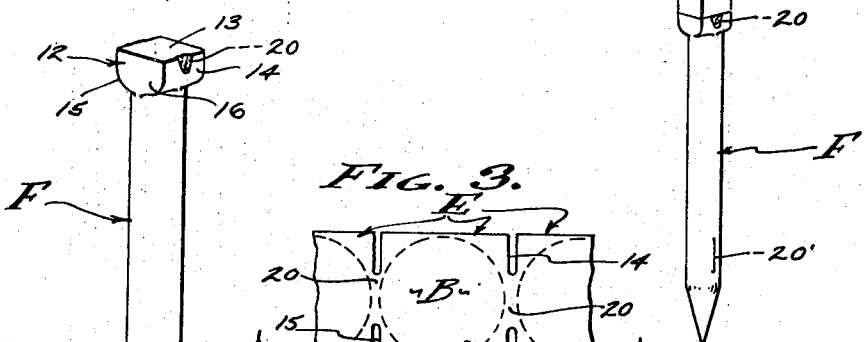
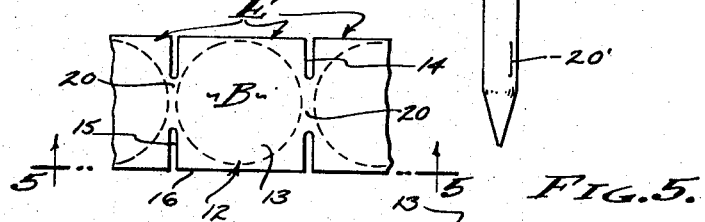
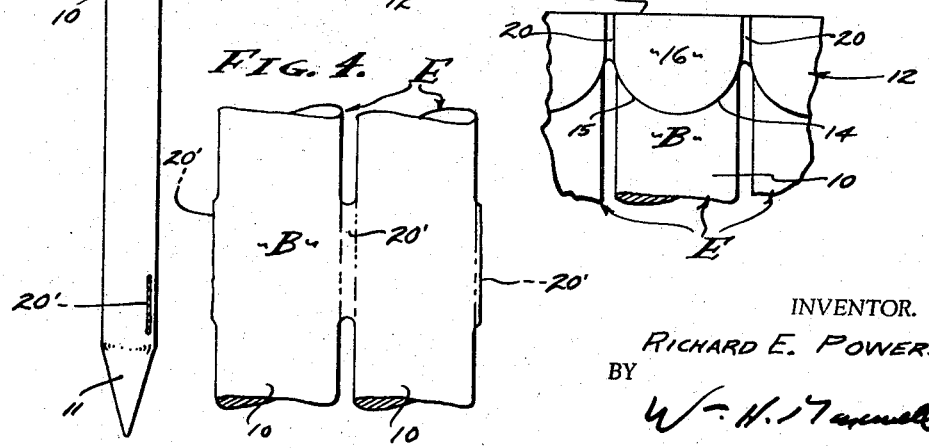
INVENTOR.
RICHARD E. POWERS
BY
AGENT _United States Patent Office_

3,348,669
Patented Oct. 24, 1967

3,348,669
BODY UNIT COMPRISING A STICK OF
SEVERABLE FASTENERS
Richard E. Powers, San Marino, Calif., assignor to Powers
Wire Products Co., Inc., El Monte, Calif., a corporation of California
Filed Jan. 18, 1965, Ser. No. 426,214
7 Claims. (Cl. 206—56)

ABSTRACT OF THE DISCLOSURE

This invention has to do with fasteners to be deployed from tools adapted to sever and drive individual fasteners from a stick supply thereof, and this invention is particularly concerned with the formation of said fasteners and the initial establishment of them in a stick, it being a general object of this invention to provide such fasteners and stock thereof formed of one body of material and which is capable of accurate as well as inexpensive manufacture.

---

This invention, in its broad sense, is applicable to various sorts and styles of fasteners, such as tacks, staples, pins and nails of all sizes and proportions; which heretofore have been made individually and then assembled into stick formation for deployment from suitable tools. Essentially, each fastener is an elongate object with one end adapted to engage, enter or wrap around a part to be fastened and with the other end adapted to receive driving force to effect said engagement. A typical fastener of the type under consideration is a nail which has one end pointed for piercing purposes and the other end headed to be engaged and driven by a driver. Heretofore, and for example, nails have been made individually in machinery which automatically forms continuous lengths of wire into individual nails; and it is this machinery which has limited speed of producton. That is, fastener forming and heading machines perform several or more operations upon the wire making it into a fastener, all of which takes time and requires the provision of and maintenance of tooling. Following this initial production of fasteners, such as nails, the multiplicity thereof must be arranged so as to be uniformly disposed and placed adjacently side by side, whereupon they are usually cemented together with a quick drying adhesive. Now, it is this entire foregoing procedure which the present invention eliminates and which not only results in economical benefits but which results in a better and virtually uniform product.

There are many other detrimental features connected with the usual prior art stick formation of fasteners. For instance, sticks of fasteners that are glued together often break apart; sticks of fasteners that are cemented together with an adhesive which must dry often become deformed and are consequently unuseable; sticks of fasteners that are not true and straight subject the driving tools to abuse and cause malfunctions; and a very important factor is waste of the fasteners as they have been made, wherein imperfect fasteners must be sorted out and discarded and/or they cause malfunctions in the stick arranging and assembling machines, and wherein deformed and broken sticks are not mechandiseable and must be scrapped.

An object of this invention is to effect the formation of a multiplicity of fasteners in a single body of material, without deformations, breakage and other like imperfections, and in a way which reduces the steps of manufacture to a bare minimum. With the present invention, a multiplicity of interconnected enlargements is integrally established simultaneously in a single body of material, initially in stick formation. The mode of forming the single body of stick formation can vary widely and it is contemplated that it be cast, molded, extruded, pressed and/or stamped. The article thus formed has the potential of being severed into individual fasteners, by displacing the enlargements from the remaining integral body. A displaced enlargement is then established as an independent fastener that is driveable in the usual manner.

It is an object of this invention to provide an integral body of material comprised of a multiplicity of enlargements, as above set forth, and which can be positioned to thereby orient the endmost enlargement thereof prior to its severance from said body and consequent establishment as an independent fastener. Thus, the fastener that is formed by said severance can be predeterminably positioned relative to a driving mechanism for accuracy of installation.

It is also an object of this invention to deploy a fastener into a part to be fastened thereby, without resort to the usual rearrangement of a plurality of individual fasteners into stick formation, but rather by the provision of an integral body of material in which enlargements thereof are severed in order to release fasteners that are properly oriented for driving into a part to be fastened thereby.

The various objects and features of this invention will be fully understood from the following detailed description of the typical preferred forms and applications thereof, throughout which description reference is made to the accompanying drawings, in which:

FIG. 1 is a perspective view of a typical stick of fasteners made according to the present invention and showing one fastener displaced and driven by a driver.

FIG. 2 is an enlarged perspective view of a single fastener at its appears severed from the stick shown in FIG. 1.

FIGS. 3 and 4 are enlarged detailed views showing fragments of the body of material forming the stick and taken as indicated by lines 3—3 and 4—4 on FIG. 1, and FIG. 5 is a view taken as indicated by line 5—5 on FIG. 3.

The invention will be understood by comparing the figures of the drawings wherein I have illustrated the body B which comprises enlargements E that are integrally interconnected and severable into individual fasteners F. In accordance with the invention, the body B is one single element of material which can be suitably formed as by casting, molding, pressing and/or stamping. The enlargements E are shaped so as to establish the potential of said body formation being disconnected into individual fasteners F and for driving engagement by a driver D is a fastener driving tool (not shown). In FIG. 1 of the drawings I have shown a typical embodiment of the present invention wherein the enlargements E in the form of nail fasteners F are such as to be severed from the body B. In this instance, the fastener is made up of an elongate cylindrical shank 10 with one end pointed at 11 for piercing purposes and with the other end headed at 12 for securement purposes and for receiving driving force.

The nail fastener F, as shown, is a finish type nail wherein the head at 12 is minimized and of but slightly greater cross-section than the shank 10. The head has a flat top 13 normal to the axis of the shank, and has depending front, back and side faces 14, 15 and 16 respectively, that depend a limited distance from the top 13. The front and back faces 14 and 15 can be parallel flat faces, and they are shown as round downwardly convergent faces that blend one into the other at the center of the side faces 16 and at the point of tangency with the cylindrical shank 10. The opposite sides 16 are shown as flat parallel faces, and all to the end that the head at 12 presents four projecting corner shoulders that extend substantially beyond the diameter of the shank 10.

The point at 11 can be a typical nail point or cone, or the like, and the fastener F can include any and all other features which are common to such fasteners. For example, serrations can be provided in the shank 10 for gripping action, and the shank cross-section can be other than round if desired, all as circumstances require. By forming the body B, as by casting or the like, precise formation can be easily incorporated therein. It is also to be understood that the nail shown is but one example of a fastener, it being contemplated that the integral formation of severable fasteners in stick form can be equally as well applied to tacks, pins, hog-rings and staples and any other like or similar fasteners.

In accordance with the invention the body B is one integral mass or element, formed preferably by casting or molding. The material from which the body is made can vary widely inasmuch as it can be cast of metals and/or molded of plastics. Where high strength and hardness is a requirement a metal body B is cast, and where moderate strength and hardness is permissible a plastic body B is molded. Further, the mode or process of forming the body B can be varied, it being feasible to stamp and/or press either the metal or plastic or like material, into the body form herein described. Thus, with different materials there are various advantages; for instance when plastic is employed a wide selection of different colors is available, as for example for use in upholstering and where low shear strength fasteners are acceptable.

The advantages feature of the present invention is the simultaneous formation of a multiplicity of fasteners F in one body B of material comprising interconnected enlargements E. The said interconnections can vary with different styles of fasteners, it being required that there be at least one connector 20 extending intermediate adjacent fasteners, preferably at the head 12. In accordance with the preferred form of the invention the adjacent fasteners F are separated, with their axes aligned so as to be disposed in a common plane. The separation of adjacent fasteners is minimized and in practice it is sufficient to discern but a hairline of light therebetween. However, it is feasible to provide a connector 20 that is substantially coextensive with the length of the fastener, in the form of a continuous web or flashing, in which case light does not show between the fastener formed enlargements. As a result, the connector 20 is of minute extent in its projection between enlargements E and the fasteners F formed thereof, and in practice the connector 20 is solid material of the body B about ⅓ the width of the head at 12 and less than the full depth of said head, or ½ depth thereof. As indicated the vertical cross-section of the connector 20 can vary, being generally of a triangular cross-section in the case illustrated.

In a stick of fasteners wherein the said fasteners F are of appreciable extent it is preferably to employ more than one connector 20, as in the case illustrated wherein the nail is substantially elongated. Another such example is that where the fastener has a large diameter head, in which case the shanks are necessarily spaced when parallelism thereof is maintained, and in this instance a connector is provided to extend intermediate the shanks. As shown, therefore, the body B is cast, molded or otherwise provided with a connector 20' at or near the pointed end 11. Again, the connector 20' is (as it is shown) of minute extent and its projection between enlargements E, and in practice the connector 20' is a web or flashing of solid material of the body B as it extends therebetween.

From the foregoing it will be apparent that a stick comprising a multiplicity of fasteners F can be produced in but one casting or molding, extruding, pressing, or stamping operation, and in such a manner that the adjacent fasteners are disposed on parallel axes in a common plane and wherein the fasteners are identically formed with the tops 13 thereof in a common plane, this being the usual and preferred disposition. As a result, the stick of fasteners is absolutely straight with perfect uniformity in the configuration of the individual fasteners per se. However, it is to be understood that lengthy, or continuous sticks of the body B can be formed and made of flexible or bendable material, in which case rolls thereof can be wrapped up, all without changing or adversely affecting the initial prearrangement of fasteners in the said stick.

Sticks of fasteners made in accordance with this invention can be mass produced in metal die casting machines, plastic molding machines, and in various presses; and with each molding operation, or the like, a complete stick of any practical length can be formed. As a result, each casting or molding operation yields many fasteners integrally formed and rigidly interconnected with little or no change of deformation or breakage, and consequently with considerable economical savings.

The method of making and deploying fasteners constructed as hereinabove described can be conducted independently of the production of an article of manufacture in the form of a stick of integrally interconnected fasteners. As above described, the article is complete and utilitarian when in the form of a cast or molded stick, in which case each fastener F is displaced from the body B by force applied in order to shear the connectors 20 and 20'. When said connectors are of minimum extent, little or no material is left to project from or to encumber the fasteners, and in practice the connectors enhance the anchoring ability of the fasteners although they can barely be detected. Therefore, having provided the body B of fasteners F as the first operation or step of the method, the endmost fastener F is displaced from the body B by a second operation or step which involves the application of force which shears the said fastener from the body. Following said second operation the application of force is continued or re-applied in the desired direction in order to drive, engage and/or accelerate the fastener into or around the part or parts to be fastened. Thus, the method involves, broadly, the step of stick formation, fastener severance, and fastener driving, all to the end that economical and superior fastener application is gained.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. A unit comprising a stick of separately drivable fasteners and including one body of material formed into a multiplicity of identical and parallel enlargements, and interconnections therebetween, each of the said enlargements being in the form of a double ended elongated fastener with one end to enter a part to be fastened and the other end to receive driving force to effect said entry, and each interconnection being in the form of solid body material extending between adjacent said other ends of the said elongated fasteners, each of said fastener formed enlargements being severable from the body of material by displacing the same with force applied to said other end of the body and thereby shearing the interconnection.

2. A unit comprising a stick of separately drivable fasteners and including, one body of material formed into a multiplicity of identical adjacently related and parallel enlargements and interconnections therebetween, each of the said enlargements being in the form of a double ended elongated fastener having a shank with one end to enter a part to be fastened and the other end with a head to receive driving force to effect said entry, each interconnection being in the form of solid body material extending between both said shanks and said heads of the elongated fasteners holding them separated and parallel, and each of said fastener formed enlargements being severable from the body of material by displacing the same with force applied to said head and thereby shearing the interconnection.

3. A unit comprising a stick of separately drivable fasteners and including, one body of material formed into a multiplicity of identical adjacently related and parallel enlargements and interconnections therebetween, each of the said enlargements being in the form of a double ended elongated fastener having a shank with one end to enter a part to be fastened and the other end with a head to receive driving force to effect said entry, each interconnection being in the form of a solid body material extending between each of said shanks and said heads of the elongated fasteners respectively and holding them separated and parallel, and each of said fastener formed enlargements being severable from the body of material by displacing the same with force applied to the head and thereby shearing the interconnections.

4. A stick of fasteners as set forth in claim 1 and wherein, the one body of material is cast and thereby formed into a multiplicity of identical enlargements and interconnections therebetween, each of the said enlargements being in the form of a double ended elongated fastener and each of said fastener formed enlargements being severable from the cast body of material.

5. A stick of fasteners as set forth in claim 1 and wherein, the one body of material is molded and thereby formed into a multiplicity of identical enlargements and interconnections therebetween, each of said enlargements being in the form of a double ended elongated fastener and each of said fastener formed enlargements being severable from the molded body of material.

6. A stick of fasteners as set forth in claim 1 and wherein, the one body of material is pressed and thereby formed into a multiplicity of identical enlargements and interconnections therebetween, each of the said enlargements being in the form of a double ended elongated fastener and each of said fastener formed enlargements being severable from the pressed body of material.

7. A stick of fasteners as set forth in claim 1 and wherein, the one body of material is stamped and thereby formed into a multiplicity of identical enlargements and interconnections therebetween, each of the said enlargements being in the form of a double ended elongated fastener, and each of said fastener formed enlargements being severable from the stamped body of material.

References Cited
UNITED STATES PATENTS

| | | | |
|---|---|---|---|
| 2,445,674 | 7/1948 | Kendall | 227—112 |
| 2,784,405 | 3/1957 | Working | 206—56 |
| 2,923,937 | 2/1960 | Laucher | 227—136 |
| 3,137,858 | 6/1964 | Powers | 206—56 |
| 3,162,871 | 12/1964 | Powers | 29—411 X |
| 3,165,968 | 1/1965 | Anstett | 206—56 X |

JOHN F. CAMPBELL, *Primary Examiner.*

THOMAS H. EAGER, *Examiner.*